US006693923B2

(12) United States Patent
Kringlebotn et al.

(10) Patent No.: US 6,693,923 B2
(45) Date of Patent: Feb. 17, 2004

(54) WAVEGUIDE LASER SOURCE

(75) Inventors: Jon Thomas Kringlebotn, Trondheim (NO); Sigurd Weidemann Løvseth, Trondheim (NO)

(73) Assignee: Optoplan AS, Trondheim (NO)

( * ) Notice: Subject to any disclaimer, the term of this patent is extended or adjusted under 35 U.S.C. 154(b) by 0 days.

(21) Appl. No.: 09/991,881

(22) Filed: Nov. 26, 2001

(65) Prior Publication Data

US 2002/0076156 A1 Jun. 20, 2002

(51) Int. Cl.[7] ................................................ H01S 3/067
(52) U.S. Cl. ............................. 372/6; 372/20; 372/102
(58) Field of Search .............................. 372/6, 20, 102

(56) References Cited

U.S. PATENT DOCUMENTS

| | | | | |
|---|---|---|---|---|
| 5,771,251 | A | 6/1998 | Kringlebotn et al. | |
| 5,844,927 | A | 12/1998 | Kringlebotn | |
| 6,061,369 | A | 5/2000 | Conradi | |
| 6,229,827 | B1 * | 5/2001 | Fernald et al. | 372/20 |

OTHER PUBLICATIONS

Amman, M.C., et al., *Tunable Laser Diodes*, 1998, pp. 211–215, Artech House, London.

Ball, G.A., et al., "Continuously Tunable Single–Mode Erbium Fiber Laser", *Optics Letters*, Mar. 15, 1992, pp. 420–422, vol. 17, No. 6, Optical Society of America.

Hong, J., et al., "Cascaded Strongly Gain–Coupled (SGC) DFB Lasers with 15–nm Coninuous–Wavelength Tuning", *IEEE Photonics Technology Letters*, Oct. 1999, pp. 1214–1216, vol. 11, No. 10.

Kringlebotn, J.T., et al., "$Er^3$+:$Yg^3$+–Codoped Fiber Distributed Feedback Laser", *Optics Letters*, Dec. 15, 1994, pp. 2101–2103, vol. 19, No. 24, Optical Society of America.

Libatique, N.J.C., et al., "Precisely and Rapidly Wavelength– Switchable Narrow–Linewidth 1.5um Laser Source for Wavelength Division Multiplexing Applications", *IEEE Photonics Technology Letters*, Dec. 1999, pp. 1584–1586, vol. 11, No. 12.

Young, M.G., et al., "Six Wavelength Laser Array with Integrated Amplifier and Modulator," *Electronics Letters*, Oct. $12^{th}$ 1995, pp. 1835–1836, vol. 31, No. 21.

* cited by examiner

*Primary Examiner*—James Davie
(74) *Attorney, Agent, or Firm*—Rothwell, Figg, Ernst & Manbeck

(57) ABSTRACT

A Bragg Grating optical waveguide laser source comprising at least one Bragg grating in a rare earth doped waveguide and an optical pump source coupled to said doped waveguide, said Bragg gratings having at least two different peak reflection wavelengths and at least one of said Bragg gratings comprising a phase-shift and a phase-shift actuator being coupled to the phase-shift for controlled application of changes in the phase-shift thus activating or deactivating the corresponding Bragg grating waveguide laser.

16 Claims, 6 Drawing Sheets

WAVEGUIDE LASER SOURCE

BACKGROUND OF THE INVENTION

1. Field of the Invention

This invention relates to a Bragg grating optical waveguide laser source comprising two or more Bragg gratings in a rare earth doped waveguide and an optical pump source coupled to said doped fibre.

2. Description of the Related Art

In wavelength division multiplexed (WDM) telecommunication systems as well as WDM sensing systems there is a need for wavelength selectable and/or tunable narrowband laser sources. In future dense WDM (DWDM) telecommunication systems and networks wavelength selectable lasers seem very attractive both as back-up lasers in multiwavelength laser transmitter modules and as wavelength switchable sources for wavelength routing/switching in optical networks. The first application typically requires very wide wavelength tuning such that one tunable laser can be a back-up for many fixed wavelength sources, but does normally not require very fast tuning. The latter application requires fast wavelength switching, typically <1 ms. Future DWDM systems will have a large number of wavelength channels with very narrow channel spacing (50 GHz or less). This requires very tight laser wavelength control combined with robust single mode laser operation with narrow linewidth (less than a few MHz) and high side-mode suppression ratio (SMSR). In addition tunable lasers should ideally provide wide tuning (>40 nm) combined with high power (>20 mW). There are several tunable multi-section semiconductor lasers under development which are aiming at the applications mentioned above [1]. However, these multi section lasers are complex, with up to 4 different currents required to control both wavelength and power and ensure mode-hop free single mode operation, and are difficult to make with both high power and wide tuning. A wavelength selectable, mode-hop free single mode laser with high SMSR can be realised by combine several semiconductor DFB laser cavities with different wavelengths on a single chip in a linear gain-coupled [2] or a parallel index-coupled [3] DFB array, with separate drive currents such that only one laser is pumped and oscillating at a time. All laser cavities can be temperature tuned simultaneously. Exact wavelength control of such lasers require wavelength lockers.

DFB fibre lasers are another attractive alternative for wavelength accurate, mode-hop free tunable single mode laser source, which seem able to satisfy the requirements described above. A DFB fibre laser typically consist of a phase-shifted fibre Bragg grating (FBG) written in a rare earth doped (eg. erbium doped) optical fibre, which when pumped by a semiconductor pump laser provides lasing at wavelength determined by the grating [4]. With an optical phase-shift of $\Phi=\Pi/2$ at the centre of the grating the round-trip phase condition of $n*2\Pi$ (n is an integer) of the laser cavity is satisfied at the centre (Bragg) wavelength of the grating, providing the lowest lasing threshold. Detuning the phase-shift away from the optimum value of $\Pi/2$ will increase the threshold and possibly prevent laser operation [4]. The wavelength of a DFB fibre laser can be set with great accuracy and repeatability in the writing of the grating, and with proper annealing the wavelength remains stable over time. DFB fibre lasers will inherently operate at two polarisations, but single-polarisation operation can be obtained for example by making a grating with differential strength for the two polarisation states. The temperature sensitivity of the laser wavelength is one order of magnitude lower than of a semiconductor DFB laser, relaxing the requirements on temperature stabilisation. The wavelength of a DFB fibre laser can be tuned continuously without mode-hopping through uniform strain/compression and/or temperature tuning of the whole laser cavity [5], [6]. Such mechanical or thermal tuning is relatively slow (typically >0.1 s). The tuning range with temperature is typically <1–2 nm due to the low temperature sensitivity. Strain/compression tuning allows tuning over typically 5–15 nm, mainly limited by the mechanical reliability of the fibre. Good control of strain/compression and temperature can provide highly accurate wavelength control without the need for closed loop control and wavelength lockers. Note that DFB fibre laser can not be directly modulated at telecommunication speeds due to the slow gain medium, and require external modulators.

A wavelength selectable fibre laser has been demonstrated using a laser cavity comprising a widely tunable filter based reflector combined with a series of FBG reflectors [7]. A wavelength selectable fibre laser system can also be made by pumping several lasers having different wavelengths with one optical pump source, where lasing at one wavelength at a time can be realised by having an optical switch between the pump source and the fibre lasers [8].

Continuously wavelength swept mode-hop free and narrow linewidth lasers are very attractive for high resolution, fast spectral characterisation of wavelength dependent optical components such as FBG filters.

SUMMARY OF THE INVENTION

OBJECTIVE

The objective with the present disclosure is to provide a single longitudinal mode fibre laser which can preform rapid wavelength switching between two or more wavelengths, with switching times <1 ms. A second objective is to provide a robustly, mode-hop free single longitudinal mode fibre laser which can be tuned to any wavelength within a wide wavelength band, requiring only two tuning control parameters. A third objective is to provide a narrow linewidth (<1 MHz) laser which can be continuously wavelength swept to measure the spectral characteristics of wavelength dependent optical components at any wavelength across a wide wavelength range. A forth objective is to provide a laser source which can provide lasing at more than one wavelength with control of the number of lasing wavelengths and where these wavelengths can be continuously tuned.

INVENTION

The objectives can be met by having several fully/partly spatially overlapping DFB fibre lasers in the same rare-earth doped fibre with different grating pitch and different phase-shift, pumped by one or more optical pump sources, which are typically a semiconductor laser. The DFB laser gratings can be written overlaid (one by one), or as a complex sampled grating with an index profile equal to a sum of the individual laser gratings. All the lasers have the same phase-shift position, but with different induced central phase-shifts $\phi_{0i}$ (i=1,2, . . . n, where n is the number of lasers) such that only one laser at the time has an optimum total phase-shift $\phi=\Pi/2\pm\delta\phi$ where $2\delta\phi$ is the range of phase-shift providing acceptable lasing conditions. The individual lasers can be turned on by changing the phase-shift of that particular laser by a controlled amount $\phi$. The change in phase-shift can be introduced by local heaters or PZT stretchers, or by locally induced changes in refractive index (using for example an electro-optically active poled fibre). In a preferred embodiment all overlaid lasers have the same phase-shift position in the fibre, but have different inherent phase-shifts, such that for a given induced phase-shift only one laser is oscillating at a time, having a total phase-shift of $\Phi=\Pi/2\pm\delta\phi$, while the other lasers have phase-shifts outside this range, and hence threshold levels too high to provide lasing. Typically, but not necessarily, the difference in peak reflection wavelength of the Bragg grating, hereafter called Bragg wavelength (grating pitch) between the individual DFB fibre lasers is so large that the reflection spectrum associated with the individual lasers have no spectral overlap. Changing the phase-shift will then allow switching between laser wavelengths separated by typically the separation between the Bragg wavelengths of the individual laser gratings. The speed of this switching will be limited i) by how fast the correct phase-shift can be introduced in the core of the fibre, and ii) by the laser cavity lifetime, which is typically 0.1–1 μs. By making the laser wavelengths matching selected ITU wavelength, fast switching between ITU wavelength channels can be realised.

In a second embodiment the phase-shifts for the individual DFB fibre lasers have different positions with individual phase-control (with eg. heaters or stretchers) such that each laser can be turned on/off individually. This can provide lasing at one or more laser wavelengths simultaneously.

The objectives can also be met by having non-overlapping or partially overlapping DFB fibre lasers with different grating pitch, either written in the same fibre or in separate fibres, where the phase-shifts of each laser can be tuned/switched independently to turn the lasers on/off independently.

Each laser wavelength can be tuned continuously by straining/compressing (or heating/cooling) the laser, enabling tuning over typically $\Delta\lambda$=5–15 nm. Combining the tuning range of the individual lasers with wavelength spacing $\Delta\lambda$ allows tuning over $m^*\Delta\lambda$, where m is the number of DFB fibre lasers, where typically only one laser is lasing at a time. An important advantage of the approach is that all lasers can be strained/compressed simultaneously using the same actuator, reducing the volume and complexity of the combined laser array. To cover a widest possible tuning range one can either have a large number (m) of lasers, or make the lasers with a large wavelength spacing $\Delta\lambda$, which still will allow mechanical tuning over the wavelength range $\Delta\lambda$.

The laser wavelength can be tuned to any wavelength within the total tuning range by controlling only two parameters, the strain/compression of the laser cavity and the induced phase-shift. This will require the temperature of the laser to be measured such that the induced strain/compression can compensate for temperature induced changes in wavelength. Alternatively passive, mechanical temperature compensation can be used to eliminate temperature induced wavelength shifts.

Alternatively the laser(s) can be operated in a wavelength sweep mode for spectral characterisation of optical components using a detector to measure the reflected or transmitted spectral power of the optical component. In the latter case normally only the wavelength range corresponding to one of the lasers can be covered at a time with continues wavelength tuning. The combined wavelength range $m^*\Delta\lambda$ can be covered by doing the first sweep with only the first laser on, the second sweep with only the second laser on, and so on. Several wavelength ranges can be covered simultaneously be operating several lasers in on-mode simultaneously and separate the wavelength scans with a wavelength demultiplexer having separate detectors at the output.

The laser wavelength can be controlled prior to the onset of the individual lasers by either measuring the strain/compression with a capacitance positioning sensor and the temperature with a temperature sensor, or alternatively by measuring the combined effect of strain/compression and temperature with an FBG sensor imprinted in the strained/compressed fibre section [Norwegian patent application 1999.5485]. The phase-shift of each laser can be set to the correct magnitude by introducing a pre-determined local increase in refractive index and/or strain at the centre of the grating, or alternatively by tuning the phase-shift to maximise the output power using a feedback loop.

BRIEF DESCRIPTION OF THE DRAWINGS

The invention will be described in detail below with reference to the accompanying drawings, illustrating the invention by way of examples.

DETAILED DESCRIPTION OF THE PREFERRED EMBODIMENTS

Figure 1:
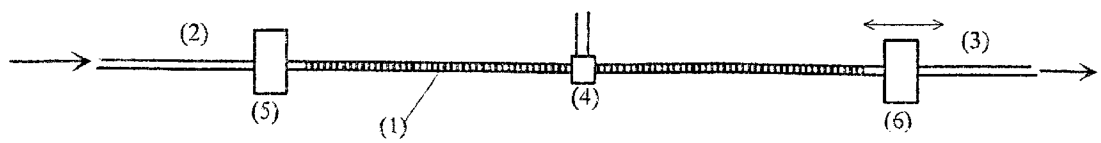
FIG. 1 shows three overlaid DFB fibre lasers having the same phase-shift position but different phase-shifts.

FIG. 1 shows n overlaid DFB fibre lasers 1 with different Bragg wavelengths in a rare-earth doped fibre, which can be an erbium or erbium-ytterbium doped fibre, which is pumped by an optical pump source, typically a semiconductor laser, through an input end 2 and emitting single mode, single wavelength laser light at output end 3 and also from end 2. Typically the lasers are made asymmetric such that most of the laser light is emitted from one end. This is standard technique and will not be described in any further detail here.

The lasers have the same phase-shift position but different inherent (UV-induced) phase-shifts. With the output from end 3 the residual pump light can be used to pump an amplifying fibre (eg. erbium) to boost the laser power. All laser gratings have different phase-shifts at the same position in the fibre, with values such that none or only one laser is lasing when pumped. The phase-shift at the centre can be changed by means of a first actuator, here called the phase-shift actuator, e.g. comprising a local heater or stretcher 4, which can be tuned electrically such that the total phase-shift is correct for any of the individual lasers, but only for one laser at a time. This allow the wavelength to be switched between the different Bragg wavelengths of the overlaid DFB fibre lasers. All laser Bragg) wavelengths can be tuned simultaneously by straining or compressing the whole laser grating, for example by fixing each end of the laser at fixing points 5,6, and moving 6 mechanically with a second actuator mechanism, for the purpose of this text called wavelength actuator. The phase-shift actuator can be a stepper motor, a piezoelectric transducer or a magnetic force transducer.

The waveguide shown in the drawings is referred to as an optical fibre, but it is evident that the invention also applies to waveguides of other types, such as planar optical waveguides. The phase-shift actuator may also be of other types than mentioned above, e.g. means for altering the refractive index of the fibre.

Figure 2:
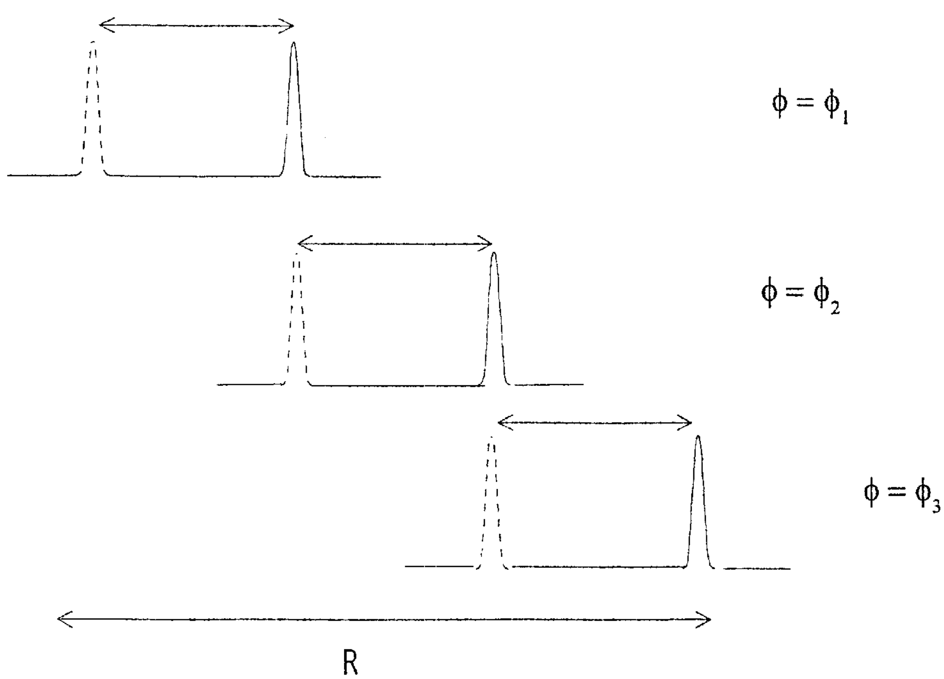
FIG. 2 illustrates schematically the wavelength spectrum of three overlaid DFB fibre lasers having the same phase-shift position, with tuning of the induced central phase-shift $\phi$ combined with strain/compression tuning, and with only one laser lasing at a time.

Such tuning provide continuous, mode-hop free tuning of the individual lasers such that any wavelength within the combined tuning range of the lasers can be reached, as illustrated in FIG. 2 for the case of three overlaid DFB fibre lasers, where only one laser is lasing at a time by controlling the central phase-shift $\Phi$. Accurate wavelength setting can be provided by changing the wavelength actuator force on the fibre and measuring the fibre strain and temperature. The total tuning range R is thus the sum og the three illustrated ranges. A larger number of lasers may of course also be applied.

Figure 3:
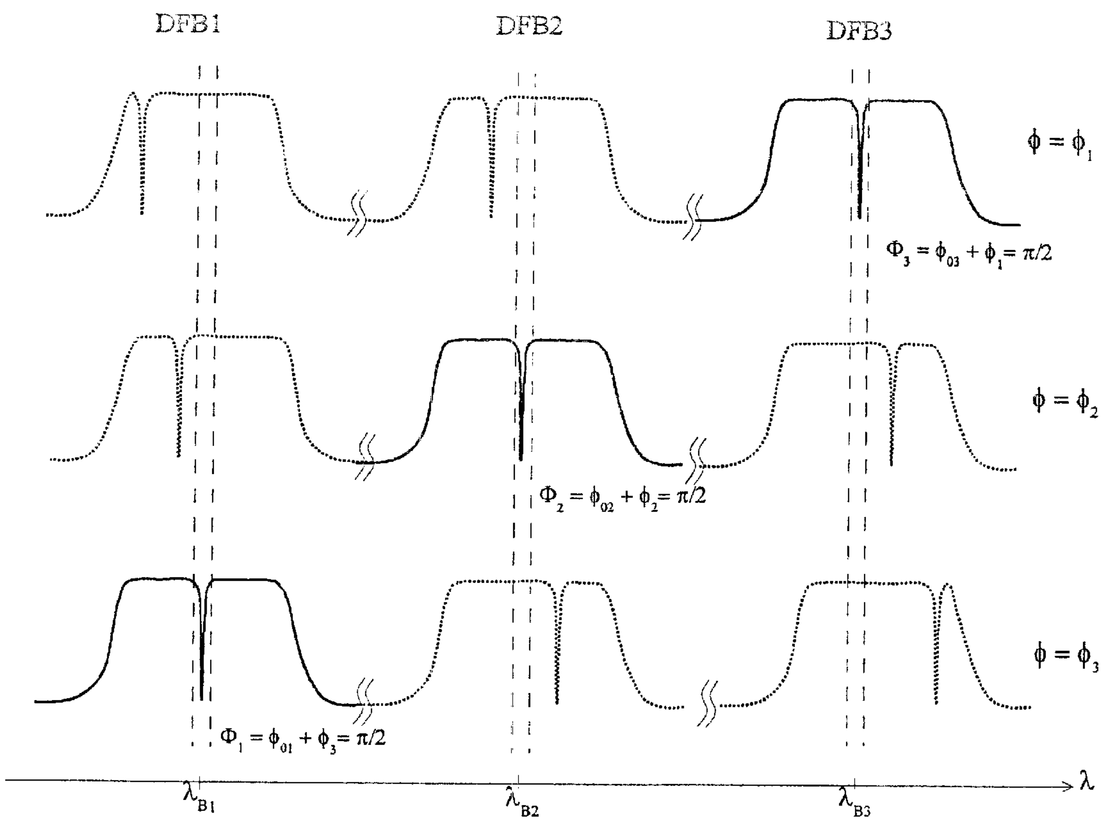
FIG. 3 illustrates schematically the reflection spectra of three overlaid DFB fibre lasers having the same phase-shift position, with different phase-shifts.

FIG. 3 illustrates schematically the reflection spectra of three overlaid DFB fibre lasers with different Bragg wavelengths $\lambda_{Bi}$ (where i is the number of the laser) and non-overlapping spectra. The lasers have the same phase-shift position, but with different induced central phase-shift $\phi$, such that only one laser at a time has an optimum total phase-shift $\phi=\Pi/2\pm\delta\phi$, where $2\delta\phi$ is the range of phase-shift providing acceptable lasing conditions. When $\Phi=\Pi/2$ the reflection spectrum has a sharp dip (resonance) at the Bragg (centre) wavelength. When $\Phi$ is detuned from $\Pi/2$ the dip is moving away from the Bragg wavelength, and the laser threshold will increase such that lasing might not be reached.

Figure 4:
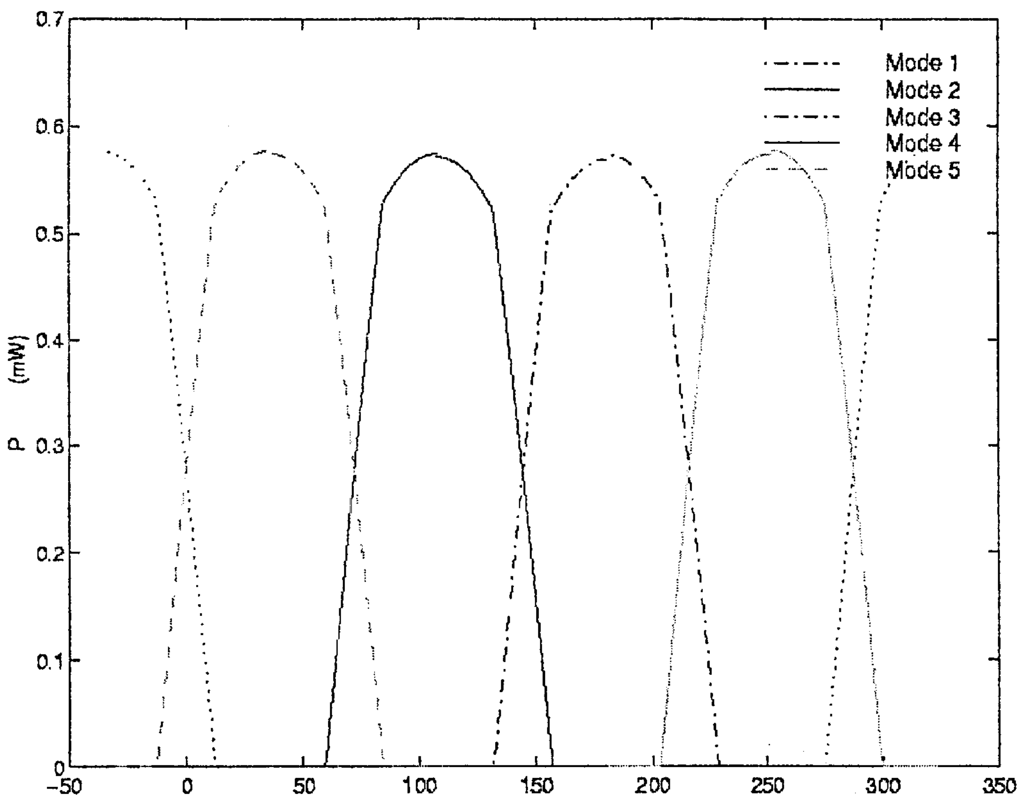
FIG. 4 shows the calculated output power from five overlaid $Er^{3+}$-doped DFB fibre lasers with 5 nm wavelength spacing as a function of the induced central phase-shift $\phi$, where only one laser is lasing at a time.

FIG. 4 shows the calculated output power P in mW from five fully overlaid $Er^{3+}$-doped DFB fibre as a function of the induced central phase-shift $\phi$, where only one laser is lasing at a time. The difference in Bragg wavelength between the individual lasers is 5 nm. The difference in initial phase-shift $\phi_0$ between the individual lasers is 72° (=360°/5) . The laser length is 10 cm and the fibre small signal absorption and gain at the laser wavelength are 12 dB/m and 16 dB/m, respectively. The grating coupling strength $K=\Pi\delta n_{eff}/\lambda$ of each laser is 55 $m^{-1}$, corresponding to an effective index modulation $\delta n_{eff}$ for each laser of $2.75*10^{-4}$, while the threshold coupling strength is 47.5 $m^{-1}$. The maximum index modulation of 5 overlaid lasers is $5*\delta n_{eff}=1.4*10^{-4}$. If the overlaid DFBs can be strained or compressed by 0.5%, corresponding to a 6 nm shift in Bragg wavelength, a total tuning range of 30 nm can be obtained.

Figure 5:
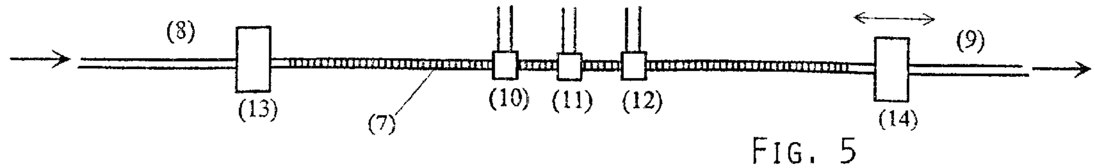
FIG. 5 shows three partially overlaid DFB fibre lasers having separated phase-shift positions and common strain/compression tuning.
Figure 6A:
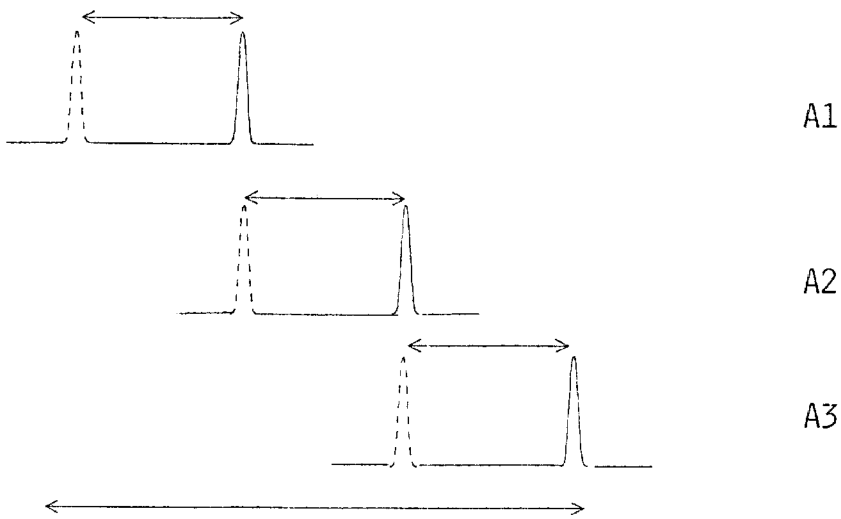
FIG. 6A illustrates schematically the wavelength spectrum of three partially overlaid DFB fibre lasers, having separated phase-shift positions, with tuning of the phase-shifts combined with strain/compression tuning, and with only one laser lasing at a time.
Figure 6B:
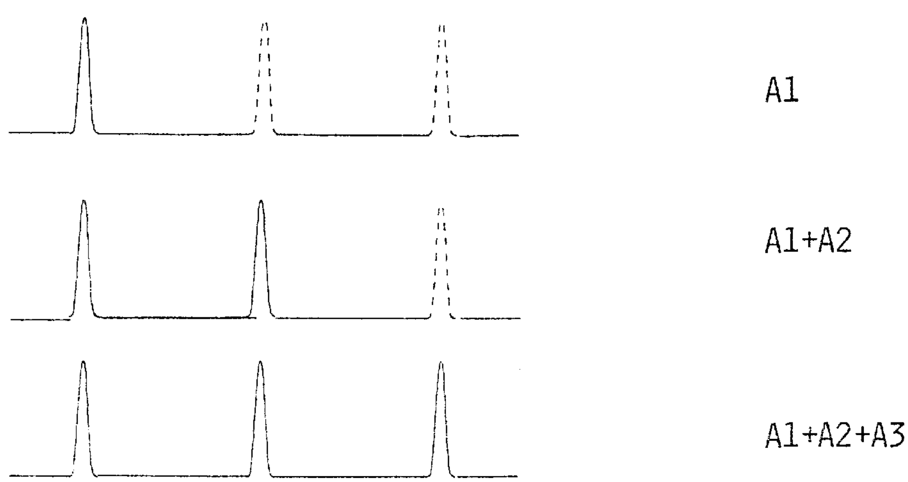
FIG. 6B illustrates schematically the wavelength spectrum of three partially overlaid DFB fibre lasers, having separated phase-shift positions, with tuning of the phase-shifts such that one to three lasers are lasing at a time.

FIG. 5 shows three partly overlaid DFB fibre lasers 7 with different Bragg wavelengths in a rare-earth doped fibre, which is pumped by an optical pump source through an input end 8 and emitting laser light at an output end 9 and also from end 8. All laser gratings have different phase-shifts at different positions along the fibre. The phase-shifts of the individual lasers can be changed by means of a local heaters or stretchers 10,11,12, which can be tuned electrically such that the total phase-shift is correct for any of the individual lasers and such that one or more than one laser can lase at a time. All laser (Bragg) wavelengths can be tuned simultaneously by straining or compressing the whole laser grating, for example by fixing each end of the laser at fixing points 13,14, and moving 14 mechanically with the wavelength actuator mechanism. This laser configuration can allow tunable single wavelength operation, as illustrated in FIG. 6A, illustrating the wavelength scan with a first, second and third phase-shift actuators A1, A2, A3, respectively operative, or multi-wavelength operation as illustrated in FIG. 6B, by separately controlling all heaters/stretchers individually and thus using the phase-shift actuators A1, A2, A3 for activating the lasers at the different wavelengths separately.

Figure 7:
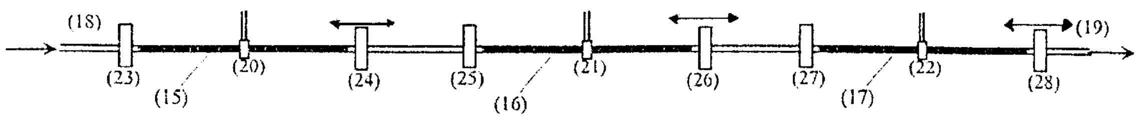
FIG. 7 shows three serially multiplexed (single or overlaid) DFB fibre lasers along the same fibre with individual phase-shift and strain/compression control.

FIG. 7 illustrates three serially multiplexed, non-overlapping DFB fibre lasers 15,16,17 with different Bragg wavelengths in a rare-earth doped fibre, which is pumped by an optical pump source through an input end 18 and emitting laser light at an output end 19 and also from end 18.

Each DFB fibre laser 15,16,17 can in principle be a series of overlaid lasers, as illustrated in FIG. 1. Each laser has individual phase-shift control by local heater/stretchers 20,21,22, which can be tuned electrically such that the total phase-shift is correct for any of the individual lasers and such that one or more than one laser can lase at a time, providing multi-wavelength operation in one single fibre. All laser wavelengths can be tuned independently by straining or compressing the lasers, for example by fixing each end of the lasers 15,16,17 at fixing points 23,24, 25,26, and 27,28, respectively, and moving 24,26,28 mechanically with a wavelength actuator mechanism.

Figure 8A:
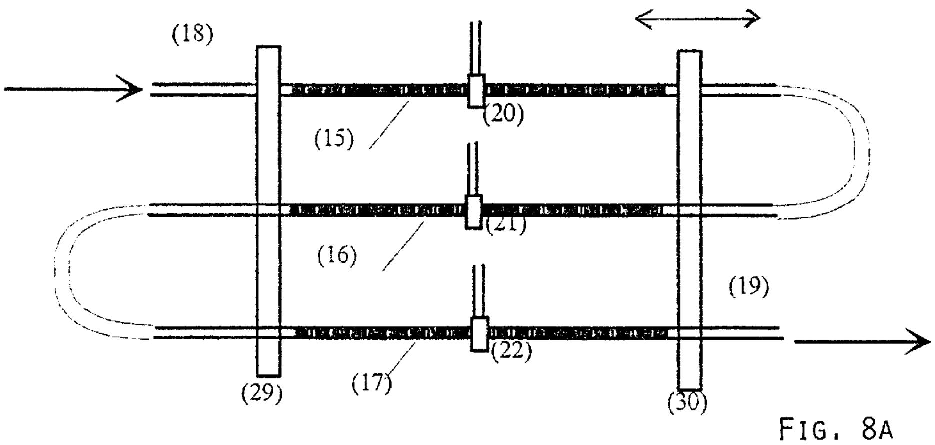
FIG. 8A shows three parallel multiplexed (single or overlaid) DFB fibre lasers along the same fibre with individual phase-shift control and common strain/compression control.

FIG. 8A illustrates three serially multiplexed, non-overlapping DFB fibre lasers 15,16,17 with different Bragg wavelengths in a rare-earth doped fibre, which is pumped by an optical pump source through an input end 18 and emitting laser light at output end 19 and also from end 18. Each DFB fibre laser 15,16,17 can in principle be a series of overlaid lasers, as illustrated in FIG. 1. Each laser has individual phase-shift control by local heater/stretchers 20,21,22, which can be tuned electrically such that the total phase-shift is correct for any of the individual lasers and such that one or more than one laser can lase at a time, providing multi-wavelength operation in one single fibre. All laser wavelengths can be continuously tuned simultaneously by straining or compressing all lasers with the same wavelength actuator mechanism, where all lasers are fixed at each end at fixing members 29,30, and moving 30 mechanically with the actuator.

Figure 8B:
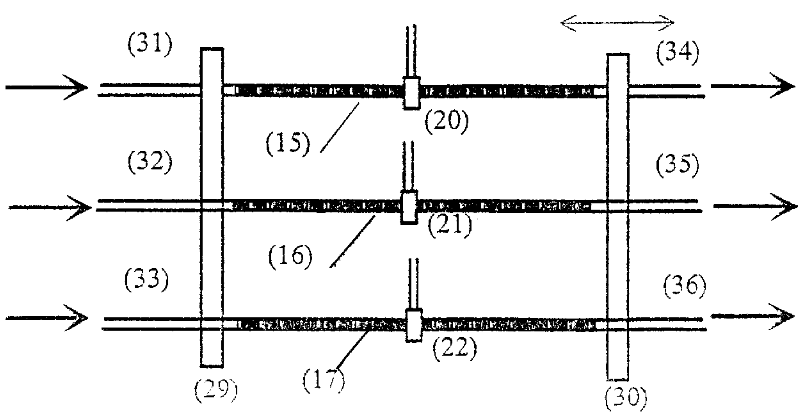
FIG. 8B shows three parallel multiplexed (single or overlaid) DFB fibre lasers in separate fibres with individual phase-shift control and common strain/compression control.

FIG. 8B illustrates three parallel DFB fibre lasers 15,16, 17 with different Bragg wavelengths in separate rare-earth doped fibres, which are pumped by a common optical pump source via an optical switch or splitter, or by separate pump sources, through input ends 31,32,33, and emitting laser light at the output ends 34,35,36, and also from ends 31,32,33. The output laser light from the different fibres can be coupled together into one fibre by means of a coupler or a wavelength multiplexer. Each DFB fibre laser 15,16,17 can in principle be a series of overlaid lasers, as illustrated in FIG. 1. Each laser has individual phase-shift control by local heater/stretchers 20,21,22, which can be tuned electrically such that the total phase-shift is correct for any of the individual lasers and such that one or more than one laser can lase at a time. All laser wavelengths can be tuned simultaneously by straining or compressing all lasers with the same actuator mechanism, where all lasers are fixed at each end at fixing members 29,30, and moving 30 mechanically with the wavelength actuator.

Figure 9A:
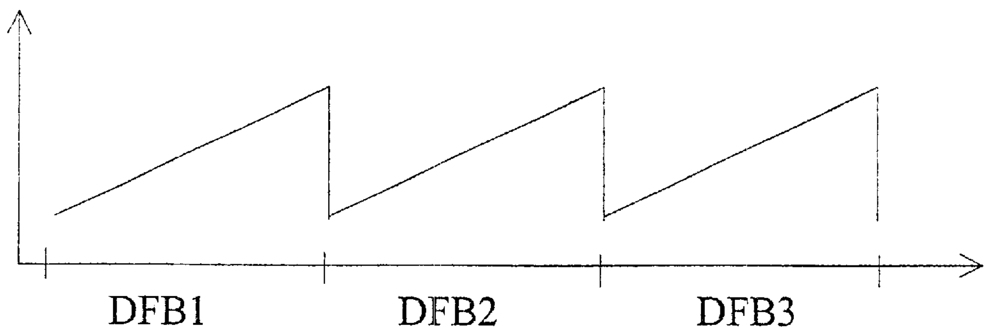
FIGS. 9A and B illustrates schematically the wavelength tuning operation of a wavelength swept DFB fibre laser array (overlaid or separate).
Figure 9B:
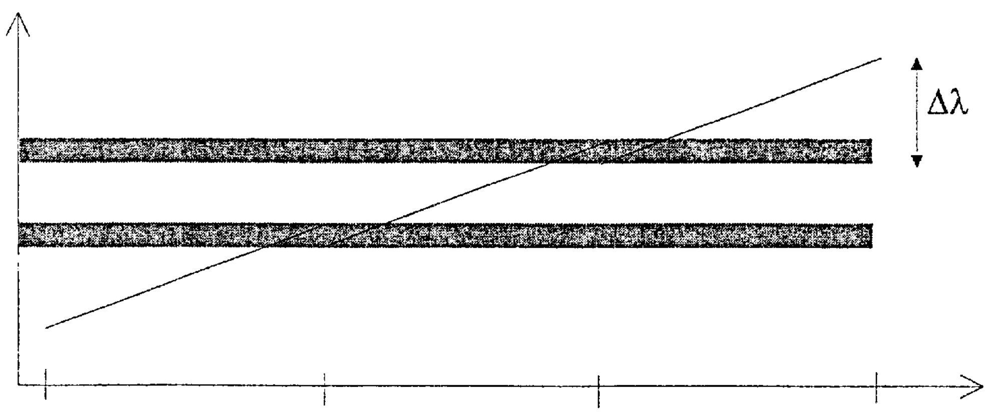

FIG. 9 illustrates schematically the wavelength tuning operation of a wavelength swept DFB fibre laser array (overlaid or separate) with three lasers, FIG. 9A illustrating the fibre strain on each laser as a function of time, and FIG. 9B illustrating the resulting output wavelength in the same time scale, the shaded areas representing the overlap between to lasers. The combined wavelength range $m^*\Delta\lambda$ (m=3) can be covered by doing the first sweep with only the first laser on, the second sweep with only the second laser on, the third sweep with only the third laser on, and so on. Normally the individual tuning ranges will have some overlap, as illustrated in the figure. The tuning will be continuous and mode-hop free within each individual tuning range, while there will be some jump between each tuning range. This is normally acceptable for characterisation of narrowband passive DWDM components.

REFERENCES

[1] Amman, M.-C., and Buus, J., *Tunable Laser Diodes*, Artech House, London, 1998.

[2] Hong, J., et.al., "Cascaded strongly gain-coupled (SGC) DFB lasers with 15-nm continuously-wavelength tuning," IEEE Photon. Technol. Lett., Vol. 11, pp. 1214–1216, 1999.

[3] Young, M. G., et.al., "Six wavelength laser array with integrated amplifier and modulator," Electron. Lett., Vol. 31, pp. 1835–1836, 1995.

[4] Kringlebotn, J. T., Archambault, J.-L., Reekie, L., and Payne, D. N, "$Er^{3+}$:$Yb^{3+}$-codoped fibre distributed-feedback laser," Optics Letters, Vol. 19, pp. 2101–2104, 1994, and U.S. Pat. No. 5,771,251.

[5] Ball, G., and Morey, W. W., Opt. Lett., Vol. 17, pp. 420–422, 1992.

[6] Kringlebotn, J. T., U.S. Pat. No. 5,844,927.

[7] Libatique, N. J. C. and Jain, R. K., "Pricisely and rapidly wavelength-switchable narrow-linewidth 1.5-μm laser source for wavelength division multiplexing applications," IEEE Photon. Technol. Lett., Vol. 11, pp. 1584–1586, 1999.

[8] Conradi, J., U.S. Pat. No. 6,061,369.

What is claimed is:

1. A Bragg grating optical wavegulde laser source comprising at least two fully, non-overlapping Bragg gratings in the same waveguide, each grating defining one laser in a rare earth doped waveguide or waveguide section and an optical pump source coupled to said doped waveguide, said at least two Bragg gratings having different grating wavelengths and corresponding phase-shifts, wherein the laser source further comprises a first actuator means for the controlled application of changes in the phase-shifts thus activating or deactivating the corresponding Bragg grating lasers.

2. A laser source according to claim 1, wherein the phase-shifts are located at a common position in the waveguide and the first actuator means being located at said common position of the phase-shifts for the controlled application of changes in the phase-shifts thus activating or deactivating the corresponding Bragg grating waveguide lasers.

3. A laser source according to claim 2, wherein the first actuator means is provided with means for altering the temperature locally in said phase-shifts, thus providing a controlled change in the phase-shifts.

4. A laser source according to claim 2, wherein the first actuator means is provided with means for providing a strain or stress in the fibre, and thus a controlled change in the phase-shifts.

5. A laser source according to claim 2, wherein the first actuator means is provided with means for altering the refractive index of the fiber, and thus a controlled change in the phase-shifts.

6. A laser source according to claim 1, wherein the phase-shifts are different, such that only one laser at a time has a total phase-shift for yielding lasing conditions.

7. A laser source according to claim 1, wherein the Bragg gratings are overlaid in the same length of waveguide, being written separately or as one complex sampled grating with an index profile equal the sum of two or more individual gratings.

8. A laser source according to claim 1, wherein the Bragg gratings are separated or partially overlapping, each grating having separate phase-shifts each being provided with a separate actuator means, thus providing means for individual activation of each grating.

9. A laser source according to claim 1, further comprising a second actuator means for the controlled application of changes in at least one grating and the corresponding grating wavelength.

10. A laser source according to claim 9, wherein the second actuator means comprises a wavelength actuator means being common for two or more Bragg gratings.

11. A laser source according to claim 10, wherein the second actuator means is provided with means for altering the temperature of the gratings, thus providing a controlled change in the grating wavelengths.

12. A laser source according to claim 10, wherein the second actuator means is provided with means for altering the strain or compression of the grating, thus providing a controlled change in the grating wavelength.

13. A laser source according to claim 9, wherein the second actuator means is adapted to provide a wavelength sweep by continuously varying the strain/compression or temperature of the gratings.

14. A laser source according to claim 1, wherein the output of the laser is monitored by an analysing means and wherein the actuators are coupled to said analysing means.

15. A laser source according to claim 1, wherein the wavelengths of the gratings correspond to chosen wavelengths in an optical communication network, said phase-shift actuators providing means for shifting between said chosen wavelengths.

16. Use of a laser source according to claim 9 for spectral characterization of optical components comprising a detector for measuring the transmitted or reflected spectral power of the optical component.

* * * * *

UNITED STATES PATENT AND TRADEMARK OFFICE

CERTIFICATE OF CORRECTION

PATENT NO. : 6,693,923 B2
DATED : February 17, 2004
INVENTOR(S) : Kringlebotn et al.

It is certified that error appears in the above-identified patent and that said Letters Patent is hereby corrected as shown below:

Title page,
Item [30], Foreign Application Priority Data, please insert
-- NO.....2000 6447.....12/15/2000 --

Signed and Sealed this

Twentieth Day of July, 2004

JON W. DUDAS
*Acting Director of the United States Patent and Trademark Office*